(12) United States Patent
Watanabe et al.

(10) Patent No.: US 6,906,149 B2
(45) Date of Patent: Jun. 14, 2005

(54) POLYMER SCALE DEPOSITION PREVENTIVE AGENT

(75) Inventors: Mikio Watanabe, Kashima-gun (JP); Tadashi Amano, Kashima-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/912,102

(22) Filed: Aug. 6, 2004

(65) Prior Publication Data

US 2005/0032990 A1 Feb. 10, 2005

(30) Foreign Application Priority Data

Aug. 7, 2003 (JP) ........................................ 2003-206448

(51) Int. Cl.$^7$ .................................................. C08F 2/00
(52) U.S. Cl. ..................... 526/62; 526/317.1; 526/319; 526/343; 526/344; 526/335
(58) Field of Search ................. 526/62, 317.1, 526/319, 343, 344, 335

(56) References Cited

U.S. PATENT DOCUMENTS

| | | |
|---|---|---|
| 4,933,399 A | 6/1990 | Shimizu et al. |
| 5,034,477 A | 7/1991 | Shimizu et al. |
| 5,034,478 A | 7/1991 | Shimizu et al. |
| 5,037,904 A | 8/1991 | Ueno et al. |
| 5,053,466 A | 10/1991 | Shimizu et al. |
| 5,098,968 A | 3/1992 | Ueno et al. |
| 5,115,051 A | 5/1992 | Shimizu et al. |
| 5,130,386 A | 7/1992 | Kaneko et al. |
| 5,147,455 A | 9/1992 | Watanabe et al. |
| 5,196,164 A | 3/1993 | Shimizu et al. |
| 5,214,112 A | 5/1993 | Shimizu et al. |
| 5,214,113 A | 5/1993 | Shimizu et al. |
| 5,229,471 A | 7/1993 | Shimizu et al. |
| 5,244,986 A | 9/1993 | Watanabe et al. |
| 5,262,497 A | 11/1993 | Watanabe et al. |
| 5,292,834 A | 3/1994 | Watanabe et al. |
| 5,298,220 A | 3/1994 | Shimizu et al. |
| 5,352,748 A | 10/1994 | Shimizu et al. |
| 5,357,009 A | 10/1994 | Shimizu et al. |
| 5,360,857 A | 11/1994 | Kitamura et al. |
| 5,378,773 A | 1/1995 | Shimizu et al. |
| 5,378,774 A | 1/1995 | Shimizu et al. |
| 5,391,653 A | 2/1995 | Shimizu et al. |
| 5,393,857 A | 2/1995 | Shimizu et al. |
| 5,397,849 A | 3/1995 | Shimizu et al. |
| 5,399,613 A | 3/1995 | Shimizu et al. |
| 5,403,903 A | 4/1995 | Shimizu et al. |
| 5,416,174 A | 5/1995 | Shimizu et al. |
| 5,420,214 A | 5/1995 | Shimizu et al. |
| 5,424,003 A | 6/1995 | Shimizu et al. |
| 5,424,377 A | 6/1995 | Shimizu et al. |

(Continued)

FOREIGN PATENT DOCUMENTS

| | | |
|---|---|---|
| EP | 0 598 537 A1 | 5/1994 |
| WO | WO 96/35723 | 11/1996 |
| WO | WO 96/35724 | 11/1996 |
| WO | WO 96/39445 | 12/1996 |
| WO | WO 96/39446 | 12/1996 |
| WO | WO 97/08210 | 3/1997 |

*Primary Examiner*—William K. Cheung
(74) *Attorney, Agent, or Firm*—Oblon, Spivak, McClelland, Maier & Neustadt, P.C.

(57) ABSTRACT

Provided is a polymer scale deposition-preventive agent. It includes (A) a condensation reaction product of an aldehyde compound and a hydroxynaphthalene compound and (B) a soluble methoxyl group-substituted cellulose ether. The agent is formed into a film having an adequate polymer scale deposition-preventive property in a single-step application. The time for the application process is shortened to improve productivity. Polymer scales can be prevented from adhering to the inner wall surfaces of the polymerization vessel even if a plenty number of batches for polymerization are repeated.

13 Claims, 2 Drawing Sheets

U.S. PATENT DOCUMENTS

| | | | |
|---|---|---|---|
| 5,430,113 A | 7/1995 | Usuki et al. | |
| 5,432,241 A | 7/1995 | Usuki et al. | |
| 5,442,017 A | 8/1995 | Shimizu et al. | |
| 5,457,170 A | 10/1995 | Shimizu et al. | |
| 5,484,855 A | 1/1996 | Shimizu et al. | |
| 5,484,856 A | 1/1996 | Shimizu et al. | |
| 5,508,361 A | 4/1996 | Shimizu et al. | |
| 5,574,115 A | 11/1996 | Shimizu et al. | |
| 5,576,370 A | 11/1996 | Shimizu et al. | |
| 5,602,215 A | 2/1997 | Watanabe et al. | |
| 5,616,660 A * | 4/1997 | Shimizu et al. | 526/62 |
| 5,723,553 A | 3/1998 | Watanabe et al. | |
| 6,037,426 A | 3/2000 | Shimizu et al. | |
| 6,320,001 B1 | 11/2001 | Shimizu et al. | |
| 6,335,403 B1 | 1/2002 | Shimizu et al. | |
| 6,362,291 B1 | 3/2002 | Shimizu et al. | |

\* cited by examiner

POLYMER SCALE DEPOSITION PREVENTIVE AGENT

BACKGROUND OF THE INVENTION

1. Field of the Invention

The present invention relates to a polymer scale deposition preventive agent which prevents polymer scale deposition on the inner wall surface of a polymerization vessel and so on when a polymer is produced by polymerizing an ethylenic double bond-containing monomer in the polymerization vessel.

2. Description of the Prior Art

It is known that a polymer is deposited on the inner wall surface of a polymerization vessel and so on as a scale when an ethylenic double bond-containing monomer is polymerized.

The deposition of the polymer scale becomes more marked as the number of batches for polymerization increases, thereby reducing the yield of the polymer and the capability for cooling the inside of the polymerization vessel. If the polymer scale is peeled off from the inner wall surface of the polymerization vessel and is mixed in the polymer obtained, the quality of the product is lowered. Not only it takes excessive effort and time to remove the polymer scale deposited on the inner wall surface, but also there is a danger that the unreacted monomer remaining in the polymer scale causes damage to human bodies.

A method for preventing polymer scale from depositing on the inner wall surface of a polymerization vessel and so on when an ethylenic double bond-containing monomer is polymerized has been conventionally known in which a polymer scale deposition preventive agent is applied on the inner surface of the polymerization vessel, a stirrer, and so on to form a coating film. Known examples of this polymer scale deposition preventive agent include a mixture of a condensation reaction product of naphthols and an aldehyde compound and an inorganic colloid (and further a soluble polymer compound) (Patent Reference 1), a reaction product of hydroxymethanesulfinic acid sodium salt and naphthols (Patent References 2 to 5), and a mixture of the reaction product and a polyvinylalcohol (Patent Reference 6).

However, it has been revealed that, for example, a polymer scale deposition-preventive coating film formed of the polymer scale deposition preventive agent described in Patent Reference 1 has an inadequate polymer scale deposition-preventive effect near the gas-liquid interface in the polymerization vessel particularly in the case of a polymerization reaction with the polymerization temperature of about 60° C. or more. Furthermore, when the number of batches for polymerization increases to about 150 or more batches, polymer scales deposited near the gas-liquid interface begin to grow. When the degree of the growth becomes high, the polymer scales are finally peeled off and mixed in the polymer obtained, causing fish eyes in the polymer product.

As the number of batches repeated for polymerization increases, the layer of a polymer scale deposition preventive agent gradually becomes thick because the polymer scale deposition preventive agent is repeatedly applied to the inner wall surface of a polymerization vessel. This layer is partially pealed off and mixed in the polymer obtained, causing colored particles in the polymer product and discolorations such as yellowing of the molded product. This phenomenon is called initial discoloration.

[Patent Reference 1]
U.S. Pat. No. 5,576,370
[Patent Reference 2]
PCT international publication No. WO 96/35723
[Patent Reference 3]
PCT international publication No. WO 96/35724
[Patent Reference 4]
PCT international publication No. WO 96/39445
[Patent Reference 5]
PCT international publication No. WO 97/08210
[Patent Reference 6]
PCT international publication No. WO 96/39446

SUMMARY OF THE INVENTION

An object of the present invention is to provide a polymer scale deposition preventive agent for producing a polymer by polymerizing an ethylenic double bond-containing monomer; said agent being capable of improving the productivity because the agent can be applied to the inner wall surface and so on in a single-step application to form a polymer scale deposition-preventive coating film (hereinafter referred to as "scale-preventive coating film") thereon; said scale-preventive coating film formed exerting an adequate polymer scale deposition-preventive effect even if the polymerization reaction is conducted at high temperature of about 60° C. or more and even if the number of batches for polymerization increases to about 150 or more batches; and said agent reducing the mixing of peeled scales and colored particles in the polymer product obtained, thereby enabling the improvement of the product quality such as significant decrease in the number of fish eyes and in the initial discoloration.

The present inventors made extensive investigations to achieve the aforementioned object and consequently have completed the present invention.

Thus, the present invention provides a polymer scale deposition preventive agent for polymerization of an ethylenic double bond-containing monomer, comprising:

(A) a condensation reaction product of an aldehyde compound and a hydroxynaphthalene compound, and (B) a soluble methoxyl group-substituted cellulose ether (hereinafter referred to as "scale-preventive agent").

DETAILED DESCRIPTION OF THE PREFERRED EMBODIMENTS

The present invention will now be described below in detail. Herein, "initial discoloration" means a discoloration which occurs when a polymer product is molded under heating and pressure, and "anti-initial discoloration property" means a resistance to such a discoloration.

[(A) Condensation Reaction Product]

The component (A) is a condensation reaction product obtained by subjecting an aldehyde compound and a hydroxynaphthalene compound to a condensation reaction in the presence of a solvent.

The condensation reaction to obtain the component (A) will now be described below in detail.

<Aldehyde Compound>

An organic compound having an aldehyde group (—CHO) can be used as an aldehyde compound that is a raw material of the component (A), with no particular restrictions. Examples of the aldehyde compound include formaldehyde, acetaldehyde, propionaldehyde, butyl aldehyde, acrolein, crotonaldehyde, benzaldehyde, furfural, phenylacetaldehyde, 3-phenylpropionaldehyde, and 2-phenylpropionaldehyde. These may be used singularly, or in combination of two or more.

<Hydroxynaphthalene Compound>

An organic compound having a naphthalene skeleton in which at least one hydrogen atom bonded to a carbon atom forming the skeleton has been substituted with a hydroxyl group can be used as a hydroxynaphthalene compound that is a raw material of the component (A), with no particular restrictions. Examples of the hydroxynaphthalene compound include 1-naphthol, 2-naphthol, 1,3-dihydroxynaphthalene, 1,5-dihydroxynaphthalene, 1,7-dihydroxynaphthalene, 6-hydroxy-2-naphthoic acid, 2-hydroxy-1-naphthoic acid, 1-hydroxy-2-naphthoic acid, and 8-hydroxy-1-naphthoic acid. These may be used singularly, or in combination of two or more.

Of these hydroxynaphthalene compounds, 1-naphthol and 2-naphthol are preferred.

<Proportion of the Raw Materials Used>

The proportion of the aldehyde compound and hydroxynaphthalene compound used for the condensation reaction cannot be generally determined because it may be necessary to adjust the proportion depending on the types of the two compounds, the types of a solvent and a catalyst, and conditions for the condensation reaction. However, the proportion is preferably such that the molar ratio of the aldehyde groups (—CHO) in the aldehyde compound to the hydroxyl groups in the hydroxynaphthalene compound is typically 0.1 to 10 and particularly 0.5 to 5.

<Condensation Reaction Solvent>

The solvent used in the condensation reaction of the two raw materials is water, an organic solvent, or a mixed solvent of these.

The organic solvent is not particularly restricted as long as it can dissolve the two raw materials to form a homogeneous solution, but a water-soluble organic solvent is preferred. Examples of the organic solvent include alcohols such as methanol, ethanol, and propanol; ketones such as acetone and ethyl methyl ketone; esters such as methyl acetate and ethyl acetate; and a compound represented by the general formula (1)

(1)

wherein $R^1$ represents an alkyl group having 1 to 3 carbon atoms, and X represents a methylene group (—CH$_2$—) or a divalent group represented by the formula: —NR$^2$— where $R^2$ represents an alkyl group having 1 to 3 carbon atoms. These may be used singularly, or as a mixed solvent of two or more. As mentioned above, a mixed solvent of the organic solvent and water can be used.

In the general formula (1), $R^1$ represents an alkyl group having 1 to 3 carbon atoms. Examples thereof include methyl groups, ethyl groups, propyl groups, and butyl groups. Of these, methyl groups are preferred. In the case where X represents a group represented by the formula: —NR$^2$—, $R^2$ represents the same alkyl group as described for $R^1$, and methyl groups are preferred.

Examples of the compound represented by the general formula (1) include N-methyl-2-pyrrolidone, N,N'-dimethyl-2-imidazolidone, N-ethyl-2-pyrrolidone, N,N'-diethyl-2-imidazolidone, N-propyl-2-pyrrolidone, and N,N'-dipropyl-2-imidazolidone, and N-methyl-2-pyrrolidone and N,N'-dimethyl-2-imidazolidone are preferred. As mentioned above, these compounds may be used singularly, or in combination of two or more.

Of the aforementioned solvents, the compound represented by the general formula (1), in particular, N-methyl-2-pyrrolidone, N,N'-dimethyl-2-imidazolidone, or a mixed solvent of these, or a mixed solvent of the compound represented by the general formula (1) and water is preferred because of the following reason: the compound or the mixed solvent dissolves the raw material hydroxynaphthalene compound well, generates no precipitate during a condensation reaction, and can produce a homogeneous solution of the condensation reaction product after the condensation reaction, and it is therefore possible to effectively avoid the mixing of the condensation reaction-derived precipitate in the polymer product.

If the mixed solvent of the compound represented by the general formula (1) and water is used, the proportion of these is not particularly restricted. However, the quantity of the compound is typically 2 to 500 parts by weight and preferably 5 to 200 parts by weight based on 100 parts by weight of water.

The quantity of the solvent used is not particularly restricted as long as the solvent can dissolve the two raw materials to form a homogeneous solution thereof and can produce a homogeneous solution of the condensation reaction product after the condensation reaction. However, the quantity of the solvent is typically 2 to 500 parts by weight and preferably 5 to 200 parts by weight based on 100 parts by weight of the two raw materials.

<Condensation Reaction>

After the two raw materials are homogeneously dissolved in the solvent, the condensation reaction is conducted typically at room temperature to 200° C. and preferably at 30 to 150° C. in the presence of a catalyst. The time required for the condensation reaction is typically 2 to 100 hours and preferably 3 to 30 hours although it may be adjusted depending on the combined quantity of the two raw materials.

It is preferable to use a catalyst in the condensation reaction. Examples of the catalyst include acidic catalysts such as sulfuric acid, hydrochloric acid, perchloric acid, p-toluenesulfonic acid, methanesulfonic acid, and trifluoromethanesulfonic acid; and basic catalysts such as sodium hydroxide, potassium hydroxide, and ammonium hydroxide. The quantity of the catalyst used may be an effective quantity as catalyst with no particularly restrictions but is typically 1 to 20 parts by weight and preferably 2 to 15 parts by weight based on 100 parts by weight of the combined quantity of the two raw materials. Using the aforementioned quantity, the condensation reaction can be promoted advantageously from an economical viewpoint and adequately.

The pH of the reaction mixture for the condensation reaction is not particularly restrictions but is typically 1 to 13 and preferably 7 to 13. As necessary, a pH adjustor can be added to the reaction mixture without restricting the type and quantity of the pH adjustor added.

The condensation reaction enables the production of a condensation reaction product of the aldehyde compound and the hydroxynaphthalene compound in a homogeneous solution. Then, the removal of the solvent from the solution produces the condensation reaction product of the component (A) of the present invention. If there are no problems in the preparation of the scale-preventive agent, the solution can be used as it is for preparing the scale-preventive agent of the present invention. This is advantageous because it can simplify the process.

<Reducing Agent>

It is preferable to add a reducing agent to the reaction mixture or the condensation reaction product for a certain period of time in at least one of the stage before the start of the condensation reaction, the stage during the condensation reaction, and the stage after the end of the condensation reaction. It is particularly preferable to add the reducing agent to the condensation reaction product after the end of the condensation reaction. Addition of the reducing agent advantageously improves the stability of the homogeneity of the condensation reaction product solution obtained by the condensation reaction, prevents the solution from producing a gel material even after a long-time storage of the solution, and prevents beforehand the gel material from mixing in the polymer product and from affecting the quality of the product. Furthermore, the addition of the reducing agent also has the advantage of the improvement in the scale deposition-preventive effect of the scale-preventive coating film obtained form the scale-preventive agent of the present invention.

"The stage before the start of the condensation reaction" means a stage after the preparation of the solution of the two raw materials and before the time point when the step for raising the temperature of the reaction mixture from room temperature to a predetermined reaction temperature is terminated. "The stage during the condensation reaction" means a stage after the temperature of the reaction mixture reaches the predetermined reaction temperature and when unreacted raw materials remain in the reaction mixture and the condensation reaction is not terminated. "The stage after the end of the condensation reaction" means a stage after the condensation reaction is terminated and when the condensation reaction product is present in a solution.

Examples of the reducing agent include sulfites, phosphites, nitrites, reducing sugars, and thiourea dioxides.

Examples of the sulfites include ammonium sulfite, potassium sulfite, sodium sulfite, ammonium hydrogen sulfite, sodium hydrogen sulfite, sodium dithionite ($Na_2S_2O_4$), and Rongalite.

Examples of the phosphites include ammonium phosphite, sodium phosphite, potassium phosphite, calcium phosphite, uranyl phosphite, cobalt phosphite, ferrous phosphite, ferric phosphite, copper phosphite, barium phosphite, hydrazinium phosphite, ammonium hydrogen phosphite, sodium hydrogen phosphite, potassium hydrogen phosphite, calcium hydrogen phosphite, cobalt hydrogen phosphite, cuprous hydrogen phosphite, cupric hydrogen phosphite, ferrous hydrogen phosphite, ferric hydrogen phosphite, lead hydrogen phosphite, barium hydrogen phosphite, magnesium hydrogen phosphite, manganese hydrogen phosphite, and hydrazinium hydrogen phosphite.

Examples of the nitrites include ammonium nitrite, sodium nitrite, potassium nitrite, calcium nitrite, zinc nitrite, silver nitrite, cobalt potassium nitrite, cobalt sodium nitrite, strontium nitrite, cesium nitrite, cerium nitrite, cupric nitrite, nickel nitrite, barium nitrite, magnesium nitrite, lithium nitrite, and rubidium nitrite.

The reducing sugars are sugars having a free aldehyde group or carbonyl group and showing reducibility. Examples thereof include maltose, lactose, and glucose.

Each of sulfites, phosphites, nitrites, reducing sugars, and thiourea dioxides exemplified above may be used singularly, or in combination of two or more. Furthermore, two or more of the reducing agents, for example, a combination of sulfites and phosphites, may be used in combination.

Of these reducing agents exemplified above, sulfites and thiourea dioxides are preferred.

In the case where the reducing agent is used, the quantity used is typically 0.01 to 10 parts by weight and preferably 0.1 to 3 parts by weight based on 100 parts by weight of the combined quantity of the two raw materials.

[(B) Soluble Methoxyl Group-substituted Cellulose Ether]

The most greatest feature of the scale-preventive agent of the present invention is a combination of the soluble methoxyl group-substituted cellulose ether of the component (B) with the condensation reaction product of the component (A) This combination enables the formation of a scale-preventive coating film markedly excellent in the scale-preventive effect by a single-step application and enables the production of a polymer product having no problem in quality.

Herein, "soluble methoxyl group-substituted cellulose ether" means a soluble cellulose ether in which the cellulose molecule containing glucose rings each of which has three hydroxyl groups has at least one hydroxyl group substituted with a methoxyl group. Therefore, the soluble methoxyl group-substituted cellulose ether also includes those having the hydroxyl groups substituted with other groups in addition to the hydroxyl groups substituted with a methoxyl group.

"A degree of substitution" means as follows with "a degree of methoxyl group substitution" as an example: "a degree of methoxyl group substitution" means the average number of hydroxyl groups substituted with methoxyl groups per glucose ring in a cellulose molecule. This applies to the case in which substituents other than methoxyl groups are present. Therefore, the "degree of substitution" is indicated as the number in the range from 0 to 3.

Examples of the component (B) include methylcellulose, 2-hydroxypropylmethylcellulose, 3-hydroxypropylmethylcellulose, and 2-hydroxyethylmethylcellulose. Of these, methylcellulose and 2-hydroxypropylmethylcellulose are preferred in terms of more improved scale-preventive effect.

The degree of methoxyl group substitution of the component (B) is not particularly restricted as long as the component (B) is soluble, and is typically 0.5 to 2.5 and particularly preferably 1.3 to 2.0. The component (B) may be used singularly, or in combination of two or more. For example, two or more methylcelluloses, each of which has a different degree of methoxyl group substitution, may be combined.

In the present invention, it is preferable to use the component (B) which has a viscosity at 20° C. of 2000 mPa·s or less and further 30 to 1000 mPa·s in a 2% by weight aqueous solution thereof. Using a soluble cellulose ether with such a viscosity, the viscosity of the coating liquid of the scale-preventive agent of the present invention becomes suitable regarding application workability, and a uniformly and sufficiently thick scale-preventive coating film with an excellent scale deposition-preventive effect can easily be formed.

It is preferable that the quantity of the component (B) used is within the range of typically 0.1 to 150 parts by weight and particularly 1 to 30 parts by weight based on 100 parts by weight of the condensation reaction product of the component (A). The quantity is desirably within the aforementioned range because a good coating film of a scale deposition-preventive agent can be obtained.

[(C) Inorganic Colloids and Alkaline Metal Silicates]

In addition to the components (A) and (B), (C) at least one compound selected from the group consisting of an inorganic colloid and a non-colloidal alkaline metal silicate may further be added to the scale-preventive agent of the present invention. The combination of the component (C) has effects of increasing the adsorption force of the scale-preventive coating film onto the wall surface of the polymerization vessel and of improving the scale-preventive effect, and may lead to preferable results.

The inorganic colloids include, for example, colloids of oxides of metals such as aluminum, thorium, titanium, zirconium, antimony, tin, and iron; colloids of hydroxides of the aforementioned metals; colloids of elements such as selenium, sulfur, gold, and silver; and colloids of compounds such as silica, tungstic acid, vanadium pentoxide, and silver iodide. These may be used singularly, or in combination of two or more. Among them, preferred are colloids of oxides of aluminum, titanium, antimony, tin, or iron; colloids of hydroxides of the aforementioned metals; and colloidal silica.

There are no particulate limitations on the production process of the inorganic colloids. For example, particulate colloids produced by a dispersion process using water as a dispersion medium or an agglomeration process are available. The size of the colloidal particles is not particularly limited and is typically 1 to 500 m$\mu$ and particularly 4 to 100 m$\mu$.

The alkaline metal silicates include, for example, metasilicates: $M_2SiO_3$ (M represents an alkaline metal. The same applies to the following.), orthosilicates: $M_4SiO_4$, disilicates: $M_2Si_2O_3$, trisilicates: $M_3Si_3O_7$ and sesquisilicates: $M_4Si_3O_{10}$ of an alkaline metal such as lithium, sodium or potassium; and solid water glass: $Na_2O.nSiO_2$ (n represents a positive number of 2 to 4). These may be used singularly, or in combination of two or more. Among them, preferred is solid water glass: $Na_2O.nSiO_2$.

In the case where the component (C) is used together, it is preferable that the quantity used is typically 0.1 to 100 parts by weight and particularly 1 to 30 parts by weight based on 100 parts by weight of the condensation reaction product of the component (A).

[Preparation of Scale-preventive Agent]

When the scale-preventive agent is prepared, for example, the component (A) is mixed with the solution of the component (B). The solution of the condensation reaction product obtained by the condensation reaction of the components (A) may directly mixed with the solution of the component (B). As necessary, the component (C), an optionally added component, is also mixed together in this mixing step.

To prepare the solution of the component (B), water or a mixed solvent of water and a hydrophilic organic solvent having an affinity for water may be used as a solvent. The hydrophilic organic solvent may include, for example, alcohol type solvents such as methanol, ethanol and propanol; ketone type solvents such as acetone and methyl ethyl ketone; ester type solvents such as methyl acetate and ethyl acetate; and compounds represented by the general formula (1), such as N-methyl-2-pyrrolidone and N,N'-dimethyl-2-imidazolidone. These may be used singularly, or as a mixed solvent of two or more.

Of the above solvents, it is preferable to use water, a mixed solvent of water and the aforementioned alcohol type solvent, or a mixed solvent of water and the compound represented by the general formula (1) in terms of a good solubility of the component (B) and relatively low odor.

In the case where the mixed solvent of water and the hydrophilic organic solvent is used, the hydrophilic organic solvent may preferably be used in such a content that a possibility that the components added may precipitate as a result of the concentration change by the volatilization of the hydrophilic organic solvent is lowered and there is no problem on the danger such as combustion and toxicity and on the safety in handling. Stated specifically, the content in a mixed solvent of water may preferably be 50% by weight or less, and more preferably 30% by weight or less.

A pH adjuster such as sodium hydroxide, potassium hydroxide, and ethylenediamine may optionally be added and mixed when the solution of the component (B) is prepared.

The concentration of the component (B) in the solution of the component (B) is necessary to be adjusted depending of the type of the component (B) used, and may preferably be in the range from 1.0 to 15% by weight, more preferably from 2.0 to 10% by weight.

As describe above, the scale-preventive agent containing each of the components can be produced in a homogeneous liquid product, and the mixing operation itself is not particularly limited. The mixers may be conventionally used ones, and, for example, apparatuses such as a reaction vessel having a stirrer and a heating jacket can be used.

The thus-obtained homogeneous liquid product of the scale-preventive agent of the present invention is used as a coating liquid applied to the inner wall surface of a polymerization vessel.

The total quantity of the components (A) to (C) in the coating liquid is preferably in the range where the condensation product does not precipitate, and therefore is typically in the range from 4 to 25% by weight and preferably from 8 to 20% by weight.

The pH of the coating liquid is alkaline so that the condensation product may not precipitate, and therefore is typically in the range from 9 to 13.5% and preferably from 10.5 to 13.0% by weight. The pH can be set by optionally adjusting the quantity of the pH adjuster such as sodium hydroxide, potassium hydroxide, and ethylenediamine.

[Formation of Scale-preventive Coating Film]

Figure 1:
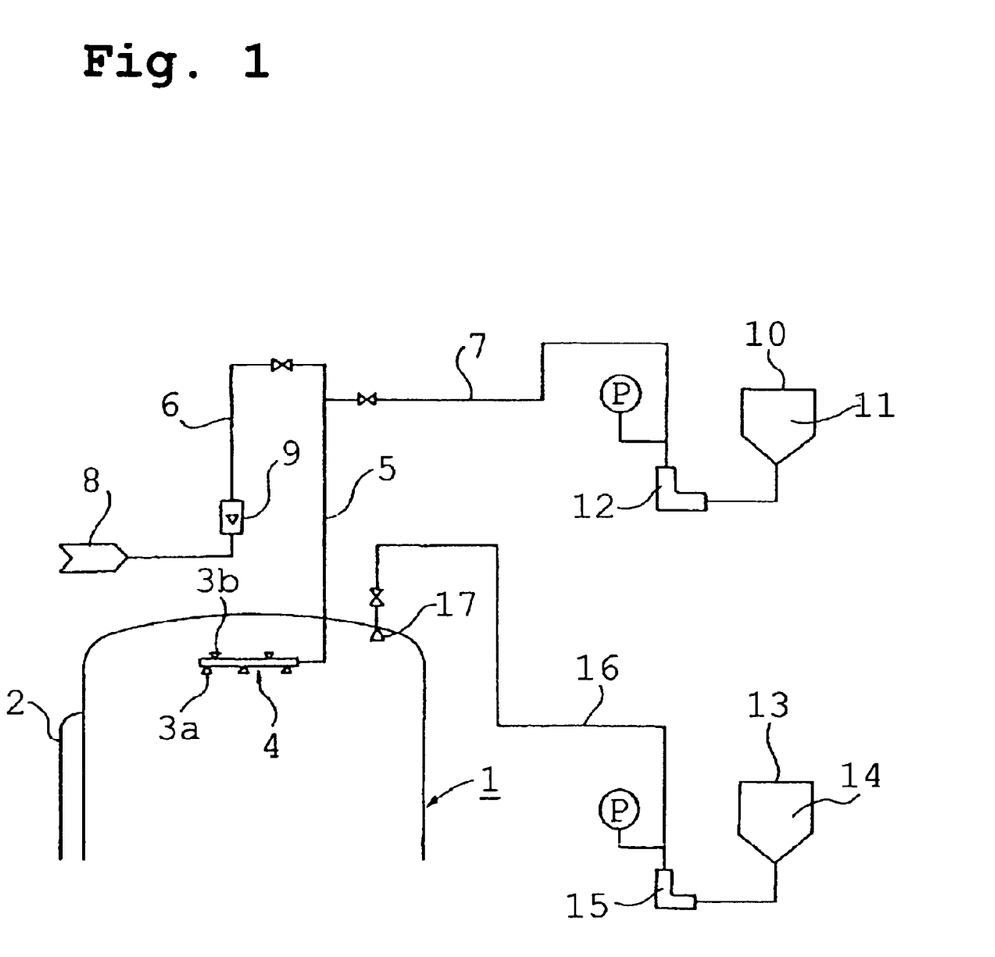
FIG. 1 is a schematic illustration of an apparatus used for the formation of a scale-preventive coating film with the scale-preventive agent of the present invention.

The formation process of the scale-preventive coating film using the scale-preventive agent of the present invention will be described with reference to FIG. 1. Although the process for coating the scale-preventive agent of the present invention is not particularly limited, it is preferable that, for example, steam is used as a carrier and the scale-preventive agent is applied to the inner wall of a polymerization vessel. FIG. 1 is a schematic illustration of an apparatus used for the formation of a scale-preventive coating film.

<Carrier Steam>

The steam used as a carrier of the coating liquid may be steam usually available or superheated steam, and may preferably be steam having a pressure of typically from 0.196 to 3.43 MPa·G (2 to 35 kgf/cm$^2$·G) and particularly from 0.196 to 1.96 MPa·G (2 to 20 kgf/cm$^2$·G). The steam may preferably have a temperature of typically from 120 to 260° C. and particularly form 130 to 200° C.

The aforementioned values of the pressure and temperature of the steam mean values measured before the point when the steam is mixed with the coating liquid, for example, at the inside of the steam feed line 6 as shown in FIG. 1.

<Coating Step>

Step 1. (Pre-heating of Polymerization Vessel Inner Wall Surfaces and Others by Steam)

Hot water or the like is passed through a jacket 2 attached to a polymerization vessel 1 to pre-heat the polymerization vessel inner wall surfaces to a temperature of 50° C. or above and preferably from 50 to 95° C. At the upper part of this polymerization vessel, a coating ring 4 is provided which is formed of a ring-shaped pipe and has downward nozzles 3a and upward nozzles 3b. To the coating ring 4, a line 5 is connected through which the steam and the coating liquid are integrally fed from the outside of the polymerization vessel 1.

To the line 5 are connected a steam feed line 6 and a coating liquid feed line 7 through the respective valves. If necessary, the steam fed through the steam feed line 6 and the line 5 may alone be blown into the polymerization vessel from the coating nozzles 3a and 3b of this coating ring 4 to pre-heat also baffles (not shown) and stirring blades (not shown) placed inside the polymerization vessel. In this apparatus, the steam is fed to the coating ring 4 from a steam feeder 8 via a flowmeter 9 through lines 6 and 5.

Step 2. (Coating of Scale-preventive Agent)

The steam is fed to the coating ring 4, and the coating liquid 11 held in a coating liquid tank 10 is fed to the coating ring 4 through lines 7 and 5 by means of a pump 12 or an aspirator valve (not shown). In the figure, P denotes a pressure gauge. The coating liquid is, in the state of mist integrated with steam, applied to and coated on polymerization vessel inner wall surfaces and surfaces with which polymers come into contact during polymerization, such as baffle surfaces and stirring blade surfaces. Simultaneously with this coating, the coating liquid coated on these surfaces is dried, so that the coating film of the scale-preventive agent is formed. Hence, it is unnecessary to make any particular operation for the drying.

The steam (G) and the coating liquid (L) inside the line 5 may preferably be controlled in a mixing ratio (L/G) of from typically 0.005 to 0.8 and particularly from 0.01 to 0.2, as flow rate ratio (based on weight) per unit time. Setting the mixing ratio within the range makes it possible to form the mist in the state suitable for forming the scale-preventive coating film on the polymerization vessel inner wall surfaces.

Step 3. (Water Washing)

After the steam and the coating liquid are stopped being fed, the inside of the polymerization vessel 1 is washed with cleaning water 14 held in a water tank 13. The cleaning water is fed into the polymerization vessel from nozzles 17 through a line 16 by means of a pump 15. In the case where the state of the formation of the coating film is good and the polymer product quality is not affected even if the water washing step is omitted, the water washing is not performed to enable the simplification of the steps and the improvement of the productivity.

The scale-preventive agent formed through the steps may preferably have a coating weight (after dried) of typically from 0.0005 to 3 g/m$^2$, and particularly from 0.0005 to 1 g/m$^2$. By setting the coating weight within the range, a coating film with a necessary and sufficient thickness can be formed on the polymerization vessel inner wall surfaces and can produce a good scale-preventive effect. Moreover, it is possible to reduce problems accompanying the peeling of the coating film from the polymerization vessel inner wall surfaces.

[Polymerization]

The scale-preventive agent of the present invention is applied when a monomer having an ethylenically unsaturated double bond is polymerized. Examples of the monomer include vinyl halides such as vinyl chloride; vinylidene halides such as vinylidene chloride; vinyl esters such as vinyl acetate and vinyl propionate; acrylic acid, methacrylic acid and their esters or salts; maleic acid, fumaric acid and their esters or anhydrides; conjugated diene monomers such as butadiene, chloroprene and isoprene; styrene; acrylonitrile; and vinyl ether.

Examples particularly suitable for practicing the scale-preventive agent of the present invention include the production process of polymers of vinyl halides or vinylidene halides such as vinyl chloride or vinylidene chloride, or copolymers of a monomeric mixture comprised primarily of them and of other monomer(s) by suspension polymerization or emulsion polymerization in an aqueous medium.

The scale-preventive coating film formed by the scale-preventive agent of the present invention has a high durability even if applied to the polymerization of monomers, such as α-methylstyrene, (meth)acrylic acid esters, acrylonitrile and vinyl acetate, which have a high solvency power for the conventionally known scale-preventive coating film, so that the coating film can be suitably applied even to the production of polymer beads and latex comprised of polystyrene, polymethylmethacrylate, polyacrylonitrile, etc.; the production of synthetic rubbers such as SBR, NBR, CR, IR, IIR, etc. (these synthetic rubbers are generally produced by emulsion polymerization); and the production of ABS resin.

In the polymerization of one or more of these monomers, an object of preventing scale can be effectively accomplished irrespective of polymerization types, such as suspension polymerization, emulsion polymerization, bulk polymerization and solution polymerization, even in the presence of any of additives such as emulsifiers, stabilizers, lubricants, plasticizers, pH adjusters and chain transfer agents. For example, in the case of suspension polymerization or emulsion polymerization of a vinyl monomer, various additives are optionally added to the polymerization system, as required. The additives include, for example, suspension stabilizers such as partially saponified polyvinyl alcohol and methyl cellulose; anionic emulsifiers such as sodium lauryl sulfate; nonionic emulsifiers such as sorbitan monolaurate and polyoxyethylene alkyl ether; stabilizers such as tribasic lead sulfate, calcium stearate, dibutyltin dilaurate and dioctyltin mercaptide; chain transfer agents such as trichloroethylene and mercaptans; and various pH adjusters. According to the application of the present scale-preventive agent, deposition of scale is effectively prevented in the presence of any of the additives above.

The remarkable polymer scale deposition preventive effect of the present scale-preventive agent is exhibited without being affected by the kind of polymerization initiators even when any of polymerization initiators is used. Specifically, the polymerization initiators include, for example, t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivarate, bis(2-ethoxyethyl)peroxydicarbonate, dibenzoyl peroxide, diisopropylbenzene hydroperoxide, lauroyl peroxide, 2,4-dichlorobenzoyl peroxide, diisopropyl peroxydicarbonate, α,α'-azobisisobutylonitrile, α,α'-azobis-2,4-dimethylvaleronitrile, di-2-ethylhexyl diperoxyisophthalate, potassium persulfate and ammonium persulfate.

Other conditions for polymerization may be those which are conventionally used, and there are no limitations unless the effects of the present invention are impaired. In the following, taking the cases of suspension polymerization, solution polymerization and bulk polymerization as examples, typical conditions of polymerization will be described, but the conditions are not limited thereto.

First, in the suspension polymerization, water and a dispersant are charged into a polymerization vessel. Then, a polymerization initiator is charged. Subsequently, the polymerization vessel is evacuated to reduce the initial pressure to a value of about 0.001 to 101 kPa·G (about 0.01 to 760 mmHg) or to set to the ambient pressure, and a monomer or monomers are then charged in such a quantity that the internal pressure of the polymerization vessel takes usually a value of 49 to 2940 kPa·G (0.5 to 30 kgf/cm$^2$·G). Thereafter, polymerization is carried out at a reaction temperature of 30 to 150° C. During the polymerization, one or more materials selected from water, a dispersant and a polymerization initiator are, optionally, added. Reaction temperature during the polymerization is different depending on the kind of a monomer to be polymerized. For example, in the case of polymerizing vinyl chloride, polymerization is carried out at 30 to 80° C., while in the case of polymerizing styrene, polymerization is carried out at 50 to 150° C. The polymerization may be deemed to be completed when the pressure inside the polymerization vessel has dropped to a value of 0 to 686 kPa·G (0 to 7 kgf/cm$^2$·G) or when there has been observed substantially no difference between the inlet temperature and outlet temperature of a cooling water flowing into and out of a cooling jacket provided circumferentially of the polymerization vessel (i.e., when liberation of heat due to the polymerization reaction has subsided). The amounts of the water, dispersant and polymerization initiator charged for polymerization are generally 20 to 500 parts by weight, 0.01 to 30 parts by weight, and 0.01 to 5 parts by weight, respectively, per 100 parts by weight of the monomer.

In solution polymerization, an organic solvent, such as toluene, xylene and pyridine, is used as the polymerization medium, in place of water. If necessary, a dispersant may be used. The other conditions for polymerization are generally the same as those described for suspension polymerization.

In bulk polymerization, after a polymerization vessel is evacuated to a pressure of about 0.001 to 101 kPa·G (about 0.01 to 760 mmHg) or set to the ambient pressure, a monomer and a polymerization initiator are charged into the polymerization vessel, and then polymerization is carried out at a reaction temperature of −10 to 250° C. For example, the reaction temperature is 30 to 80° C. for the polymerization of vinyl chloride, and is 50 to 150° C. for the polymerization of styrene.

EXAMPLES

The present invention will now be described below in greater detail by giving Examples and Comparative Examples.

In Tables 1 and 2, "Coating liquid No." with * means Comparative Examples, which do not meet the conditions of the present invention, and the rest means Examples.

In the following, "part(s)" refers to "part(s) by weight". In Table 1, "Condensation product (A)" refers to a condensation reaction product of the aldehyde compound of the aforementioned component (A) and a hydroxynaphthalene compound. "Auxiliary agent (B)" in the case of Examples refers to a soluble cellulose ether of the aforementioned component (B) (and the meaning in the case of Comparative Examples is as specifically described in Table 1). "Auxiliary agent (C)" refers to an inorganic colloid or an alkaline metal silicate of the component (C). (A), (B), and (C) described in Tables 1 and 2 refer to the respective components as described above. The same applies to the description in Tables 3 and 5.

[Preparation of Condensation Reaction Products]

In the following Preparation Examples of the condensation reaction product of the component (A), the weight-average molecular weight of each condensation product obtained was measured in the following way.

Measurement of weight-average molecular weight

Weight-average molecular weight in terms of polystyrene was measured by gel permeation chromatography (GPC) under the following measurement conditions.

Columns:
  Guard Column
    Trade name: shim-pack GPC-800DP (manufactured by Shimadzu Corporation)
  Analytical columns:
    Trade name: shim-pack GPC-803D, 802D (manufactured by Shimadzu Corporation)
Carrier: 10 mmol/L LiBr/DMF
Flow rate: 1.0 mL/min
Detector: UV absorption spectrum (wavelength=290 nm)
  Temperature: 60° C.

Preparation Example 1

Preparation of Condensation Product No. 1
(Aqueous Solvent System)

Into a pressure-resistant reaction vessel, 36.0 kg (250 mols) of 1-naphthol and 180 liters of 1N—NaOH aqueous solution (containing 7.2 kg (180 mols) of NaOH) were charged, and the temperature was raised to 70° C. with stirring. Next, to the reaction mixture, 19.75 kg of an aqueous solution in which formaldehyde had been dissolved (containing 1.92% by weight of formaldehyde) was dropwise added over a period of 1.5 hours at a constant rate. Until the dropwise addition was finished, the internal temperature of the reaction vessel was controlled so as not to exceed 80° C. Then, the reaction mixture was cooled to 60° C. over a period of 3 hours with the stirring kept. Next, the temperature of the reaction mixture was raised to 98° C. to carry out the reaction at 98° C. for 1.5 hours. Thereafter, the reaction mixture was cooled to obtain an alkaline solution of a condensation reaction product (Condensation Product No. 1).

Next, after the solvent of the cooled reaction mixture was removed, the residue was washed and dried at 50° C. under reduced pressure. The weight-average molecular weight of the Condensation Product No. 1 was measured to be 2,400.

Preparation Example 2

Preparation of Condensation Product No. 2
(Aqueous Solvent System; Using a Reducing Agent)

A condensation reaction product (Condensation Product No. 2, weight-average molecular weight: 2,300) was obtained in the same manner as Preparation Example 1 except that, immediately after the dropwise addition of formaldehyde was finished, 17.25 kg of a 20% by weight aqueous solution of sodium nitrite (containing 50 mols of sodium nitrite) was further dropwise added over a period of 0.1 hours at a constant rate and that, until the dropwise addition of the formaldehyde and the dropwise addition of the sodium nitrite were finished, the internal temperature of the reaction vessel was controlled so as not to exceed 80° C.

Preparation Example 3

Preparation of Condensation Product No. 3
(Organic Solvent System)

A condensation reaction product (Condensation Product No. 3, weight-average molecular weight: 5,200) was obtained in the same manner as Preparation Example 1 except that 90 kg of N-methyl-2-pyrrolidone and 90 liters of 2N—NaOH aqueous solution (containing 7.2 kg (180 mols) of NaOH) were charged in place of 180 liters of 1N—NaOH aqueous solution.

Preparation Example 4

Preparation of Condensation Product No. 4
(Organic Solvent System; Using a Reducing Agent)

A condensation reaction product (Condensation Product No. 4, weight-average molecular weight: 4,900) was obtained in the same manner as Preparation Example 2 except that 90 kg of N-methyl-2-pyrrolidone and 90 liters of 2N—NaOH aqueous solution (containing 7.2 kg (180 mols) of NaOH) were charged in place of 180 liters of 1N—NaOH aqueous solution.

Preparation Example 5

Preparation of Condensation Product No. 5
(Organic Solvent System)

A condensation reaction product (Condensation Product No. 5, weight-average molecular weight: 4,700) was obtained in the same manner as Preparation Example 1 except that 90 kg of ethanol and 90 liters of 2N—NaOH aqueous solution (containing 7.2 kg (180 mols) of NaOH) were charged in place of 180 liters of 1N—NaOH aqueous solution.

Preparation Example 6

Preparation of Condensation Product No. 6
(Organic Solvent System; Using a Reducing Agent)

A condensation reaction product (Condensation Product No. 6, weight-average molecular weight: 4,500) was obtained in the same manner as Preparation Example 2 except that 90 kg of ethanol and 90 liters of 2N—NaOH aqueous solution (containing 7.2 kg (180 mols) of NaOH) were charged in place of 180 liters of 1N—NaOH aqueous solution and that 24.51 liters of an aqueous solution in which 980 g per liters of furfural had been dissolved (containing 250 mols of furfural) was used in place of the formaldehyde aqueous solution.

Preparation Example 7

Preparation of Condensation Product No. 7
(Organic Solvent System)

A condensation reaction product (Condensation Product No. 7, weight-average molecular weight: 5,600) was obtained in the same manner as Preparation Example 1 except that 90 kg of N,N'-dimethyl-2-imidazolidone and 90 liters of 2N—NaOH aqueous solution (containing 7.2 kg (180 mols) of NaOH) were charged in place of 180 liters of 1N—NaOH aqueous solution.

Preparation Example 8

Preparation of Condensation Product No. 8
(Organic Solvent System; Using a Reducing Agent)

A condensation reaction product (Condensation Product No. 8, weight-average molecular weight: 5,400) was obtained in the same manner as Preparation Example 2 except that 90 kg of N,N'-dimethyl-2-imidazolidone and 90 liters of 2N—NaOH aqueous solution (containing 7.2 kg (180 mols) of NaOH) were charged in place of 180 liters of 1N—NaOH aqueous solution and that 43.53 kg of a 20% by weight aqueous solution of sodium dithionite (containing 50 mols of sodium dithionite) was used in place of the sodium nitrite aqueous solution.

In Table 1 below, Condensation Product Nos. 1 to 8 obtained in Preparation Examples 1 to 8 above are denoted by CP1 to CP8, respectively.

[Preparation of Coating Liquid]
Preparation of Coating Liquids Nos. 101 to 119

The condensation product (A), auxiliary agent (B), and auxiliary agent (C) shown in Table 1 below were used in the (A)/(B)/(C) weight ratio shown in Table 1. The auxiliary agents (B) and (C) used are as specifically shown in Tables 3 to 5 described below.

Furthermore, all the aforementioned components were mixed and dissolved using a solvent with the composition described in Table 2. In this dissolution, the total concentration and pH of the components (A) and (C) were adjusted as shown in Table 2. Thus, Coating liquids Nos. 101 to 119 in which the components each were uniformly dissolved were obtained.

Coating Liquid No. 102* is a soluble cellulose ether but corresponds to Comparative Example because it uses 2-hydroxyethylcellulose, which does not correspond to the component (B) of the present scale-preventive agent, in place of the component (B). Likewise, Coating Liquid No. 103* corresponds to Comparative Example in which 2-hydroxypropylcellulose is used. As the 2-hydroxyethylcellulose, trade name: hydroxyethylcellulose (manufactured by Wako Pure Chemical Industries, Ltd.) was used. As the 2-hydroxypropylcellulose, trade name: hydroxypropylcellulose (manufactured by Wako Pure Chemical Industries, Ltd.) was used.

TABLE 1

| Coating Liquid No. | Condensation Product (A) | Auxiliary agent (B) | Auxiliary agent (C) | pH adjustor | (A)/(B)/(C) (weight ratio) |
|---|---|---|---|---|---|
| 101 | CP1 | a | none | NaOH | 100/10/0 |
| 102* | CP1 | 2-hydroxy-ethyl-cellulose | 1 | NaOH | 100/150/100 |
| 103* | CP1 | 2-hydroxy-propyl-cellulose | 1 | NaOH | 100/100/10 |
| 104 | CP1 | b | none | NaOH | 100/10/0 |
| 105 | CP2 | c | none | NaOH | 100/10/0 |
| 106 | CP3 | c | none | KOH | 100/20/0 |
| 107 | CP4 | d | none | ethylene-diamine | 100/10/0 |
| 108 | CP5 | e | none | ethylene-diamine | 100/10/0 |
| 109 | CP6 | f | none | KOH | 100/10/0 |
| 110 | CP7 | g | none | KOH | 100/10/0 |
| 111 | CP8 | a | none | NaOH | 100/10/0 |
| 112 | CP1 | a | j | NaOH | 100/10/10 |
| 113 | CP2 | c | k | NaOH | 100/10/20 |
| 114 | CP3 | d | l | NaOH | 100/10/30 |
| 115 | CP4 | e | m | NaOH | 100/10/10 |
| 116 | CP5 | f | n | NaOH | 100/10/10 |
| 117 | CP6 | g | h | NaOH | 100/10/10 |
| 118 | CP7 | a | i | NaOH | 100/10/10 |
| 119 | CP8 | c | i | KOH | 100/15/20 |

*Comparative Example

TABLE 2

| Coating Liquid No. | Total concentration of (A) + (B) + (C) (% by weight) | Solvent (Composition and weight ratio) | pH of Coating Liquid |
|---|---|---|---|
| 101 | 10 | water/N-methyl-2-pyrrolidone 70/30 | 12.3 |
| 102* | 10 | water/N-methyl-2-pyrrolidone 70/30 | 12.3 |
| 103* | 10 | water/N-methyl-2-pyrrolidone 70/30 | 12.3 |
| 104 | 10 | water/N-methyl-2-pyrrolidone 70/30 | 12.3 |
| 105 | 10 | water/N-methyl-2-pyrrolidone 80/20 | 12.3 |
| 106 | 15 | water/N-methyl-2-pyrrolidone 80/20 | 10.5 |
| 107 | 10 | water/N-methyl-2-pyrrolidone 70/30 | 10.0 |
| 108 | 8 | water/ethanol 80/20 | 9.0 |
| 109 | 15 | water/ethanol 80/20 | 11.0 |
| 110 | 15 | water/N,N'-dimethyl-2-imidazolidone 50/50 | 12.5 |
| 111 | 15 | water/N,N'-dimethyl-2-imidazolidone 70/30 | 12.5 |
| 112 | 15 | water | 12.5 |
| 113 | 10 | water | 12.5 |
| 114 | 10 | water/N-methyl-2-pyrrolidone 80/20 | 12.5 |
| 115 | 10 | water/N-methyl-2-pyrrolidone 80/20 | 12.5 |
| 116 | 15 | water/ethanol 80/20 | 12.5 |
| 117 | 15 | water/ethanol 80/20 | 12.5 |
| 118 | 15 | water/N,N'-dimethyl-2-imidazolidone 80/20 | 12.5 |
| 119 | 15 | water/N,N'-dimethyl-2-imidazolidone 80/20 | 12.5 |

*Comparative Example

<Component (B)> a to g, abbreviations of auxiliary agents (B) described in Table 1, are as describe in Table 3 below. The degree of substitution of each of them is shown in Table 4. (The auxiliary agents (B) a to g described in Table 3 are manufactured by Shin-Etsu Chemical Co., Ltd.)

TABLE 3

| | Auxiliary agent (B) | Trade name | Viscosity of 2% by weight solution (mPa · s) |
|---|---|---|---|
| a | 2-hydroxypropylmethylcellulose | 60SH-50 | 40–60 |
| b | 2-hydroxypropylmethylcellulose | 60SH-4000 | 3500–5600 |
| c | 2-hydroxypropylmethylcellulose | 90SH-100 | 80–120 |
| d | methylcellulose | SM-4 | 3.2–4.8 |
| e | methylcellulose | SM-15 | 13–18 |
| f | methylcellulose | SM-100 | 80–120 |
| g | 2-hydroxyethylmethylcellulose | SEB-1500 | 1200–1800 |

TABLE 4

| Auxiliary agent (B) | Degree of methoxyl group substitution | Degree of 2-hydroxypropoxyl group substitution | Degree of 2-hydroxyethoxyl group substitution |
|---|---|---|---|
| a | 1.9 | 0.25 | — |
| b | 1.9 | 0.25 | — |
| c | 1.4 | 0.20 | — |
| d | 1.8 | — | — |
| e | 1.8 | — | — |
| f | 1.8 | — | — |
| g | 1.5 | — | 0.20 |

<Auxiliary Agent (C)> h to n, abbreviations of auxiliary agents (C) described in Table 1, are as describe in Table 5 below.

TABLE 5

| | Auxiliary agent (C) | Manufacturer or Importer | Grade (Trade name) |
|---|---|---|---|
| h | Colloidal silica | Nissan Chemical Industries, Ltd. | SNOWTEX O |
| i | Colloidal silica | Nissan Chemical Industries, Ltd. | SNOWTEX CXS-9 |
| j | Titanium oxide | Nissan Chemical Industries, Ltd. | Titanium oxide sol |
| k | Aluminum oxide | Nissan Chemical Industries, Ltd. | Alumina sol |
| l | Zirconium oxide | Nissan Chemical Industries, Ltd. | Zirconium oxide sol |
| m | Tin oxide | Nissan Chemical Industries, Ltd. | Tin oxide sol |
| n | Sodium orthosilicate | Wako Pure Chemical Industries, Ltd. | Sodium orthosilicate |

[Examples and Comparative Examples]

Figure 2:
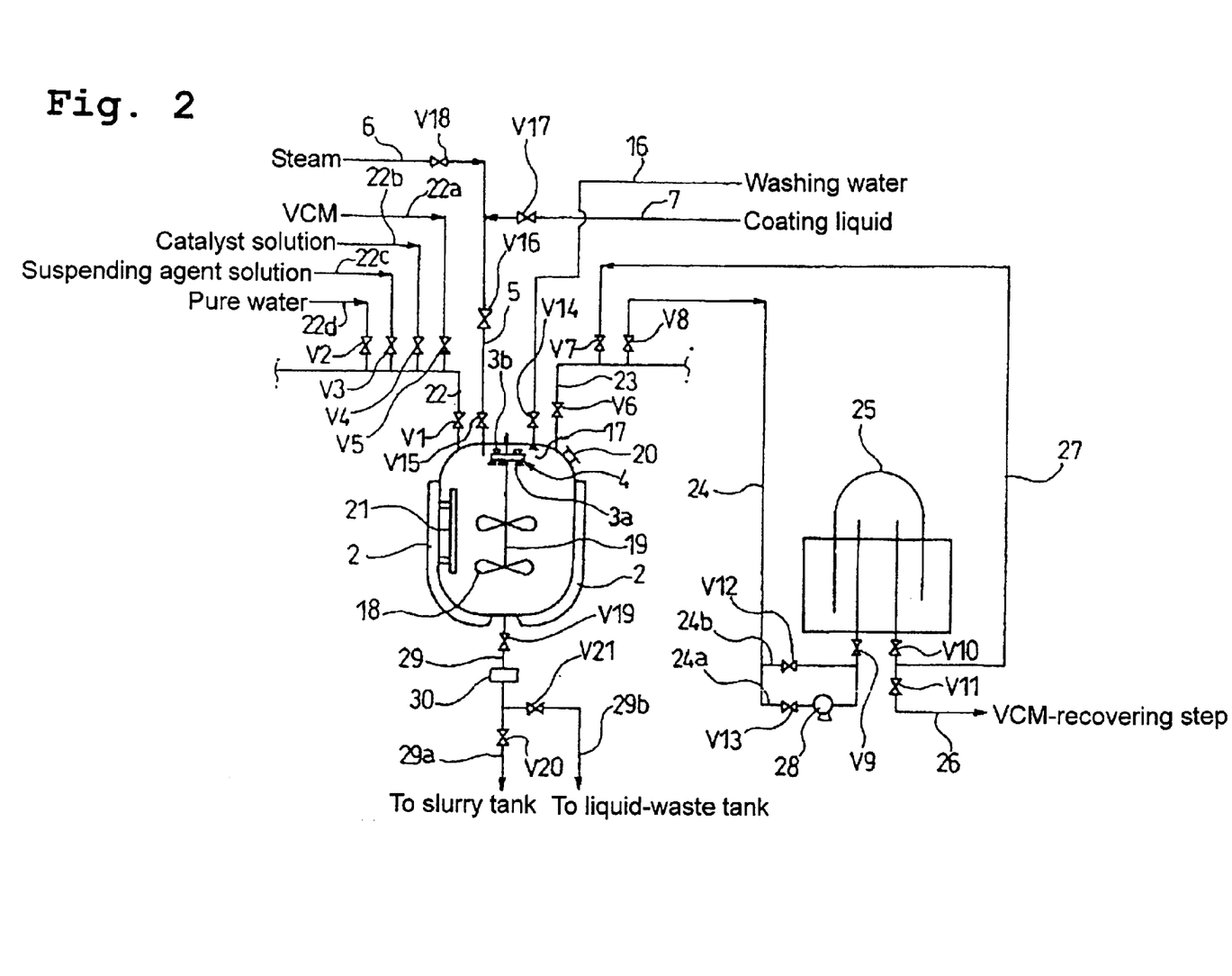
FIG. 2 is a schematic illustration of the polymerization apparatus used in Examples to perform the polymerization method in which the scale-preventive agent of the present invention is used.

The following experiments were made using the polymerization apparatus shown in FIG. 2. Elements common to FIGS. 1 and 2 are denoted with the same numerals.

In FIG. 2, a 2 m³ internal volume polymerization vessel 1 made of SUS 316L stainless steel is equipped with a stirrer 19 having stirring blades 18 (a stirring motor is not shown), a heating-cooling jacket 2, a manhole 20, a baffle 21 and other fittings (not shown) usually providing for polymerization vessels for polymerizing vinyl chloride. A line 22 connected to the upper part of the polymerization vessel 1 is a line for charging materials. To the line 22, branch lines such as a vinyl chloride monomer (hereinafter referred to as "VCM") charging line 22a, a catalyst solution charging line 22b, a suspending agent charging line 22c and a pure-water charging line 22d are connected as shown in FIG. 2. This charging lines 22 and 22a–22d are provided with valves V1, V2, V3, V4 and V5 at the positions shown in the drawing.

A line 23 also connected to the upper part of the polymerization vessel 1 is provided in order to evacuate the inside of the polymerization vessel 1 and to recover VCMs, and is led to a gas holder 25 through a line 24 branched from the line 23. A VCM recovery line 26 is led out of the gas holder 25, and a line 27 led out of the gas holder 25 is connected to the line 23 so as to be used in pressure equalization described later. These lines 23, 24, 26 and 27 are provided with valves V6, V7, V8, V9, V10, V11, V12 and V13 at the positions shown in the drawing. The line 24 is branched into a line 24a provided with a vacuum pump 28 used to evacuate the inside of the polymerization vessel 1 and to recover VCMs and a line 24b with no pump, and thereafter the branched lines are joined together to form a single line which is connected to the gas holder 25.

To the upper part of the polymerization vessel 1, a washing water feed line 16 is also connected in order to wash the inside of the polymerization vessel with water. The line 16 is provided with valves 14 at the position shown in the drawing and has a nozzle 17 at the end introduced inside the polymerization vessel. To the upper part of the polymerization vessel 1, a coating liquid feed line 7 is connected through valves V17 as shown in the drawing. Further, to the line 5 a steam feed line 6 is connected via a valve. The line 5 is provided at its end located inside the polymerization vessel with a coating ring 4 to which coating nozzles 3a, 3b are attached. These lines are provided with valves V15 and V16 at the positions shown in the drawing. The steam feed line 6 is provided with a valve 18 at the position shown in the drawing. To the bottom of the polymerization vessel 1, a line 29 is connected, which is branched into a line 29a through which polymer slurry is led to a slurry tank via a filter 30 and a line 29b through which the coating liquids or washing water is discharged to a liquid-waste tank. The lines 29, 29a and 29b are provided with valves V19, V20 and V21 at the positions shown in the drawing.

In Experiments Nos. 101 to 119, the polymerization of vinyl chloride is repeatedly performed using the Coating Liquids Nos. 101 to 119, respectively, as follows. Although the coating liquid need to be dried after applied, special operations to do so are usually unnecessary. In Examples, a drying operation (step) are not performed.

(1) Pretreatment of the Inside of the Polymerization Vessel

The scale-preventive coating film is formed on the inner wall surfaces and others of the polymerization vessel of the polymerization apparatus shown in FIG. 2, by a method below. In the initial stage, all of the valves are closed.

In the pretreatment step, a coating liquid is applied without preheating the inner wall surfaces of the polymerization vessel 1 by passing hot water through the jacket 2. This makes it possible to simplify the step.

The valves V18, V21, V19, V15 and V16 are opened, and 392 kPa·G (4 kgf/cm$^2$·G) (143° C.) of steam is blown into the polymerization vessel at a flow rate of 4 kg/min for 1 minute. After the inside of the vessel is pre-heated, the valve V17 is opened, and the coating liquid containing a scale-preventive agent is fed at a flow rate of 0.2 kg/min for 1 minute through the line 7. This makes the coating liquid integrated with the steam inside the line 5. The scale deposition-preventive agent is applied to the inner wall surfaces and others of the polymerization vessel using the steam as a carrier and dried simultaneously. At this point, the mixing ratio (G/L) between the steam (G) and the coating liquid (L) is 0.05 as flow rate ratio (based on weight). Thereafter, the valves V18, V21, V19, V15, V16 and V17 are closed.

The valves V14, V19, V21, V6, V7 and V10 are opened, and the inside of the polymerization vessel is washed with water for 1 minute. The water after the water washing is discharged to the liquid-waste tank M. Then, the valves V14, V19 and V21 are closed.

(2) Charging

The valves V1, V2 and V3 are opened, and 200 parts by weight of pure water, 0.020 part by weight of partially saponified polyvinyl alcohol and 0.026 parts by weight of 2-hydroxypropylmethylcellulose (the equivalent to "a" described in Table 3 is used) are charged into the polymerization vessel 1. Then, the valves V1, V2, V3, V6, V7 and V10 are closed.

Next, the valves V1 and V5 are opened, and 100 parts by weight of VCM is charged. Then the valve V5 is closed. Next, with the charged materials being stirred, the valve V4 is opened, and 0.03 parts by weight of t-butyl peroxyneodecanate is charged. Then the valves V1 and V4 are closed.

(3) Polymerization

Hot water is passed through the jacket 2 to raise the temperature while stirring the materials charged. At the time the internal temperature has reached 66° C., cooling water is passed through the jacket 2 to maintain the internal temperature at 66° C., where the polymerization is carried out. At the time the internal pressure of the polymerization vessel has dropped to 490 kPa·G (5 kgf/cm$^2$·G), the polymerization is terminated.

(4) Gas Discharging

The valves V6, V8, V12 and V9 are kept open, and unreacted VCM is discharged to the gas holder 25 until the internal pressure of the polymerization vessel returns to substantially the atmospheric pressure (101 kPa·G). Thereafter, the valves V12, V8 and V9 are closed. Then the valves V11 and V10 are opened, and VCM recovered in the gas holder 25 is sent to the VCM-recovering apparatus through the line 26. Thereafter, the valves V11 and V10 are closed.

(5) Pressure Equalization

The valves V7 and V10 are opened, and the internal pressure of the polymerization vessel 1 and the internal pressure of the gas holder 25 are made equal.

(6) Slurry Withdrawing

The valves V19 and V20 are opened, and polymer slurry is withdrawn out of the polymerization vessel to the slurry tank through the filter 30. The filter 30 is in the wire mesh form with 5 to 7 mesh size (about 3- to 4-mm aperture). If scales peeled off from the inner wall surface of the polymerization vessel are present in the polymer slurry, they are caught by the filter 30.

The polymer slurry withdrawn to the slurry tank (not shown) is thereafter dehydrated and dried to become a vinyl chloride polymer product. After the polymer slurry is withdrawn, the valve V20 is closed.

(7) Polymerization Vessel-inside First Water Washing

The valve V21 is opened. Then, the valve V14 is opened. The inside of the polymerization vessel 1 is washed with water for 5 minutes, and the wash water is sent to the liquid-waste tank through the filter 30. During this washing of the inside of the polymerization vessel, hot water is passed through the jacket 2 to keep the temperature of the polymerization vessel wall surfaces at 70° C. If, during this water washing, scales peeled off from the inner wall surface of the polymerization vessel, in particular, near the gas-liquid interface, stirring blades, and the top part and the supporting parts of the baffles are present in the polymer slurry, they are caught by the filter 30.

Thereafter, the valves V14, V19, V21, V6, V7 and V10 are closed.

(8) Steam Coating and Simultaneous Drying

The feeding of hot water to the jacket 2 is stopped. The valves V18, V21, V19, V15, V16, and V17 are opened. 392 kPa·G (4 kgf/cm$^2$·G) (143° C.) of steam and the coating liquid containing a scale-preventive agent are fed at a flow rate of 240 kg/Hr and 0.2 L/min, respectively, for 1 minute through the line 5, and the agent is applied using the steam and dried simultaneously. Thereafter, the valves V18, V21, V19, V15, V16 and V17 are closed.

(9) Polymerization Vessel-inside Second Water Washing

The valves V14, V19 and V21 are opened. The inside of the polymerization vessel 1 is washed with water for 1 minute, and the water after washing is discharged to the liquid-waste tank. Thereafter, the valves V14, V19 and V21 are closed.

The operation from the (2) charging step to the (9) polymerization vessel-inside second water washing step is set as one batching. The polymerization of VCM was repeated in each experiment by the total number of batching as described in Table 6.

<Evaluation Method>

Measurement of the Amount of Polymer Scale Deposited

In each experiment, after the final batching (for example, the 200th batching if 200-batching polymerization is performed) was completed, polymer scale built-up at the liquid-phase portion in the polymerization vessel and polymer scale built-up on the surfaces of stirring blades and baffles and in the vicinity of the boundary between the gas-phase portion and the liquid-phase portion were determined in the following way.

The scale deposited in an area of 10 cm×10 cm at a surface to be measured was scraped off with a spatula as completely as can be confirmed with the naked eye, and then the scraped scale was weighed on a balance. The measured value was multiplied by 100 to obtain the amount of the deposited scale per area of 1 m². The results are given in Table 6.

Measurement of the Amount of Scale Caught by the Filter

In each experiment, after the polymerization vessel-inside second water washing step and before the charging step in each batching, scales peeled off from the inner wall surface of the polymerization vessel and caught by the filter 30 were separated and recovered. After dried, they are measured for their weight (g). The total weight (g) for the total number of batching as described in Table 6 in each experiment is shown in Table 6.

Measurement of Fish Eyes

The number of fish eyes produced when a polymer obtained after the final batching in each experiment is formed into sheet, was measured by the method below. The results are given in Table 7.

A hundred (100) parts by weight of the polymer, 50 parts by weight of dioctyl phthalate, 1 part by weight of dibutyltin dilaurate, 1 part by weight of cetyl alcohol, 0.25 part by weight of titanium oxide and 0.05 part by weight of carbon black were mixed. The resulting mixture was kneaded at 150° C. for 7 minutes with 6 inch rolls, and then formed into a sheet 0.2 mm thick. The obtained sheet was examined for the number of fish eyes per 100 cm² by light transmission.

Measurement of Luminosity Index (L Value)

Measurement of luminosity index (L value) of a sheet formed from a polymer obtained in each experiment was carried out, according to the method below, to evaluate the anti-initial discoloration. The results are given in Table 7.

A mixture of one hundred (100) parts by weight of an obtained polymer, 1 part by weight of a dibutyltin laurate stabilizing agent (Trade name: TS-101, product of Akisima Chemical Co.) and 0.5 part by weight of a cadmium organic complex stabilizing agent (Trade name: C-100J, product of Katsuta Kako Co.), and 50 parts by weight of dioctyl phthalate as a plasticizer was kneaded at 150° C. for 5 minutes with a twin roll mill, and then formed into a sheet 0.8 mm thick. The obtained sheet was cut into pieces measuring 4 cm×4 cm, and the pieces were placed in a molding frame measuring 4 cm×4 cm×1.5 cm. Subsequently, the pieces were preheated at a temperature of 160° C. for 5 minutes and then molded under a pressure of 2.84 to 3.04 MPa (29 to 31 kgf/cm²) for 5 minutes to prepare a test specimen for measurement. This test specimen was measured for luminosity index L in the following way.

First, the stimulus value Y of XYZ color system is determined by the photoelectric tristimulus colorimetry using the standard light C and photoelectric calorimeter (Color measuring color difference meter Model Z-1001DP, product of Nippon Denshoku Kogyo K.K.) in accordance with JIS Z 8722. As the geometric condition of illumination and light reception, the condition d defined in section 4.3.1 of JIS Z 8722 is adopted.

Next, from the stimulus value Y obtained, the L value is calculated based on the Hunter's color difference equation:

$$L = 10Y^{1/2}$$

described in JIS Z 8730 (1980). The results are given in Table 7. The greater the value of L, the higher the whiteness is evaluated, namely, the better the anti-initial discoloration is evaluated.

Examination of Colored Particles

A mixture of 100 parts by weight of the polymer obtained in each experiment after the final batching was completed, 2 parts by weight of a stabilizer TVS N-2000E (available from Nitto Kasei Co., Ltd.) and 20 parts by weight of a plasticizer dioctyl phthalate was thoroughly kneaded and thereafter put in a molding frame of 160 mm×130 mm×3 mm, and was subsequently pressure-molded at a temperature of 175° C. and a pressure of 3.43 MPa (35 kgf/cm²) to produce a sample for examination. Samples thus obtained were examined visually on the number of colored particles. The results are shown in Table 7.

TABLE 6

| Experiment No. | Coating Liquid No. | Total batching number | Amount of deposited scale (g/m²) | | | | Amount of scale caught by filter (g) |
|---|---|---|---|---|---|---|---|
| | | | Liquid-phase portion | Vicinity of gas-liquid boundary | Stirring blades | Baffle | |
| 101 | 101 | 200 | 0 | 3 | 4 | 4 | 25 |
| 102* | 102* | 100 | 0 | 120 | 28 | 41 | 270 |
| 103* | 103* | 100 | 0 | 85 | 16 | 34 | 250 |
| 104 | 104 | 200 | 0 | 48 | 19 | 35 | 45 |
| 105 | 105 | 200 | 0 | 3 | 2 | 4 | 21 |
| 106 | 106 | 200 | 0 | 0 | 0 | 3 | 10 |
| 107 | 107 | 200 | 0 | 0 | 0 | 2 | 11 |
| 108 | 108 | 200 | 0 | 4 | 3 | 5 | 22 |
| 109 | 109 | 200 | 0 | 0 | 2 | 3 | 21 |
| 110 | 110 | 200 | 0 | 0 | 0 | 2 | 13 |
| 111 | 111 | 200 | 0 | 0 | 0 | 2 | 15 |
| 112 | 112 | 200 | 0 | 0 | 1 | 1 | 10 |
| 113 | 113 | 200 | 0 | 0 | 1 | 1 | 7 |
| 114 | 114 | 200 | 0 | 0 | 0 | 0 | 4 |
| 115 | 115 | 200 | 0 | 0 | 0 | 0 | 1 |
| 116 | 116 | 200 | 0 | 0 | 1 | 1 | 8 |
| 117 | 117 | 200 | 0 | 0 | 1 | 1 | 6 |
| 118 | 118 | 200 | 0 | 0 | 1 | 1 | 7 |
| 119 | 119 | 200 | 0 | 0 | 0 | 0 | 3 |

*Comparative Example

TABLE 7

| Experiment No. | Fish eyes (number) | Luminosity index (L value) | Colored particles (number) |
|---|---|---|---|
| 101 | 11 | 73.0 | 11 |
| 102* | 67 | 72.0 | 83 |
| 103* | 58 | 72.0 | 78 |
| 104 | 21 | 73.0 | 22 |
| 105 | 11 | 73.0 | 4 |
| 106 | 12 | 73.0 | 4 |
| 107 | 6 | 73.0 | 3 |
| 108 | 11 | 73.0 | 12 |
| 109 | 6 | 73.0 | 4 |
| 110 | 12 | 73.0 | 11 |
| 111 | 11 | 73.0 | 13 |
| 112 | 4 | 73.0 | 14 |
| 113 | 4 | 73.0 | 4 |
| 114 | 1 | 73.0 | 1 |
| 115 | 2 | 73.0 | 1 |
| 116 | 4 | 73.0 | 12 |
| 117 | 3 | 73.0 | 4 |
| 118 | 4 | 73.0 | 13 |
| 119 | 1 | 73.0 | 2 |

*Comparative Example

[Evaluation]

It is clear from the results described in Table 6 that the amount of the scale deposited is remarkably low, in particular, in the vicinity of the gas-liquid boundary in the polymerization vessel and in the stirring blade part and the baffle part in the Experiments Nos. 101 and 104 to 119 in which a scale-preventive coating film has been formed on the inner mall surface of the polymerization vessel in a single step application using a scale-preventive agent containing the components (A) and (B) of the present invention, compared with the case where 2-hydroxyethylcellulose or 2-hydroxypropylcellulose, which does not correspond to the component (B), is used in place of methoxyl group-substituted soluble cellulose ether of the component (B), even if a plenty number of batches (200 batches) for polymerization are repeated under high temperature polymerization reaction conditions of 66° C.

The amount of the scale caught by the filter 30 corresponds to the amount of the scale deposited or stacked on the inner wall surface of the polymerization vessel and peeled off therefrom. It is also clear from the amount of the scale caught by the filter 30 that the scale-preventive agent of the present invention is remarkably excellent in the preventive effects on the scale deposition to the inner wall surface of the polymerization vessel. In addition, it is also clear from the results described in Table 7 that, in the case where the scale-preventive agent of the present invention is used, the amount of colored particles conceivably due to the peeling of the scale-preventive coating film is low and that a polymer product having no problem in quality such as anti-initial discoloration is produced.

[Effects of the Invention]

According to the scale-preventive agent of the present invention, a scale-preventive coating film having an adequate polymer scale deposition-preventive property can be formed in a single-step application; the time for the process is shortened to improve productivity; and also, polymer scales can be prevented effectively from adhering to not only wall surfaces at the liquid-phase portion in the polymerization vessel but also the vicinity of the gas-liquid boundary, stirrers, and baffle surfaces facing the wall surface even if a plenty number of batches for polymerization are repeated under high temperature polymerization reaction conditions. Hence, the colored particles can be made extremely less mix into polymers than conventional products, and also formed products obtained by forming the polymers into sheets can be made to have very less fish eyes and also have extremely excellent anti-initial discoloring, thereby enabling the production of polymer products with improved quality.

What is claimed is:

1. A polymer scale deposition preventive agent for polymerization of an ethylenic double bond-containing monomer, comprising:
   (A) a condensation reaction product of an aldehyde compound and a hydroxynaphthalene compound, and
   (B) a soluble methoxyl group-substituted cellulose ether.

2. The agent according to claim 1, wherein the component (B) has a viscosity at 20° C. of 2000 mPa·s or less in a 2% by weight aqueous solution thereof.

3. The agent according to claim 1, wherein the average number of hydroxyl groups substituted with methoxyl groups is 0.5 to 2.5 per glucose ring in the component (B).

4. The agent according to claim 1, wherein the component (B) is at least one soluble methoxyl group-substituted cellulose ether selected from the group consisting of methylcellulose, 2-hydroxypropylmethylcellulose, 3-hydroxypropylmethylcellulose, and 2-hydroxyethylmethylcellulose.

5. The agent according to claim 1, wherein the condensation reaction product of the component (A) is obtained by subjecting the aldehyde compound and the hydroxynaphthalene compound to a condensation reaction in the presence of an organic solvent containing a compound represented by the general formula (1):

(1)

wherein $R^1$ represents an alkyl group having 1 to 3 carbon atoms, and X represents a methylene group (—$CH_2$—) or a divalent group represented by the formula: —$NR^2$— where $R^2$ represents an alkyl group having 1 to 3 carbon atoms.

6. The agent according to claim 1, wherein the condensation reaction product of the component (A) is obtained by adding a reducing agent to a reaction mixture or a condensation reaction product for a certain period of time in at least one of the stage before the start of the condensation reaction, the stage during the condensation reaction, and the stage after the end of the condensation reaction.

7. The agent according to claim 1, wherein the agent further comprises:
   (C) at least one compound selected from the group consisting of an inorganic colloid and a non-colloidal alkaline metal silicate.

8. The agent according to claim 1, wherein a combination of the components (A) and (B) is present in a quantity of 4 to 25% by weight.

9. The agent according to claim 7, wherein a combination of the components (A), (B), and (C) is present in a quantity of 4 to 25% by weight.

10. The agent according to claim 1, wherein the component (B) is present in a quantity of 0.1 to 150 parts by weight based on 100 parts by weight of the component (A).

11. A process for producing a polymer by polymerizing an ethylenic double bond-containing monomer in a polymerization vessel, wherein a polymer scale deposition-preventive coating film comprised of a polymer scale deposition-preventive agent of claim 1 comprising:

(A) a condensation reaction product of an aldehyde compound and a hydroxynaphthalene compound, and (B) a soluble methoxyl group-substituted cellulose ether has been formed on the inner wall surface of the polymerization vessel and areas with which the monomer comes in contact during the polymerization.

12. The process according to claim 11, wherein the monomer is at least one compound selected from the group consisting of vinyl chloride, vinylidene chloride, vinyl acetate, vinyl propionate, acrylic acid, acrylic acid esters, acrylates, methacrylic acid, methacrylic acid esters, methacrylates, maleic acid, maleic acid esters, maleic anhydride, fumaric acid, fumaric acid esters, fumaric anhydride, butadiene, chloroprene, isoprene, stylene, acrylonitrile, and vinyl ethers.

13. The process according to claim 11, wherein the polymerization is conducted by suspension polymerization, emulsion polymerization, mass polymerization, or solution polymerization.

* * * * *